Oct. 16, 1956 G. C. BOWER 2,767,113
PLANT-TIES AND METHOD OF MANUFACTURE
Filed June 2, 1952

INVENTOR.
Gerald C. Bower
BY
Stedman B. Hoar
Agent

United States Patent Office 2,767,113
Patented Oct. 16, 1956

2,767,113

PLANT-TIES AND METHOD OF MANUFACTURE

Gerald C. Bower, Santa Ana, Calif.

Application June 2, 1952, Serial No. 291,273

8 Claims. (Cl. 154—93)

This invention relates to ties for plants and to a method of manufacturing the same, and more particularly relates to a plant tie having a wire reinforcement in a waterproof tie-strip and a method of effecting a lasting bond between the wire and the strip.

For some years, plant ties have been commercially available that have a wire reinforcement in a paper casing. It will be appreciated, however, that a plant tie, used in a garden or in general agriculture, is subject to all conditions of weather, and when used to tie bunches of vegetables or cut flowers, it is subject to wetting and to refrigeration and other stratagems for keeping the flowers or vegetables in fresh and marketable condition. It is desirable that the materials of a plant tie should be resistant to sun-light, heat, cold, and intensive wetting. It is furthermore desirable that the wire, which permits fastening the tie by merely twisting it, and the outer casing or ribbon which facilitates handling and prevents the wire from cutting the stems or stalks, should be bonded together so that the casing or ribbon cannot slide from, or tear from or bunch up on the wire. No plant tie having all these desired qualities and yet economical to manufacture has appeared to my knowledge prior to my present invention.

It is an object of this invention to provide a plant tie which has an imbedded wire by which it may be twisted, and an outer casing of material resistant to sunlight, heat, cold, and wetting.

A further object of this invention is to provide a plant tie so bonded that its casing and wire will not become separated, to the injury of plants and to the inconvenience, and possible injury to the fingers, of the person using it.

Another object of this invention is to provide a plant-tie so formed that printed matter thereon will be undistorted after the tie has been formed.

Another object of this invention is to provide an economical and efficient method of manufacturing a plant tie of the above-enumerated qualities.

Other advantages inherent in my invention will be pointed out as this specification proceeds, or will be apparent from the following description considered together with the accompanying drawing, in which.

Figure 1:
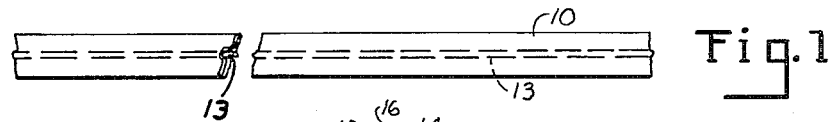
Fig. 1 is a plan view of a plant tie illustrative of my invention.
Figure 2:
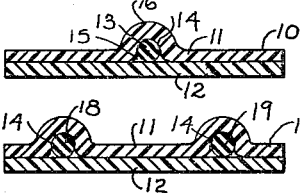
Fig. 2 is a cross-sectional view on an enlarged scale of the tie shown in Fig. 1.

Having reference now to the details of the drawing, I have shown in Figs. 1 and 2 a plant tie 10 formed of two strips or ribbons 11 and 12 of water-resistant plastic material and a wire 13 held between the ribbons. As material for the ribbons 11 and 12 I prefer to use polyvinyl chloride, this material being highly resistant to sunlight as well as to water and being thermoplastic so as to soften at high temperature and then being capable of uniting under pressure, one piece of polyvinyl chloride to another, as if welded. However, polyvinyl chloride in sheet or ribbon form does not readily adhere to metal, and to cause the ribbons 11 and 12 to adhere to the wire 13, I give the wire a coating 14 of a thermoplastic bonding or cementitious material, such as a lacquer of polyvinyl chloride made quick-drying by addition of ethyl alcohol, and then treat the ribbons in accordance with the hereinafter described steps of my process. It is quite important that the lacquer 14 be quick-drying, as aforesaid, in order that it may be substantially dry before being brought into contact with the ribbons 11 and 12. Of course various drying means well known in the art, such as hot-air blasts, may be used to expedite the drying. If wires covered with still-wet lacquer are brought into contact with ribbons of the same chemical nature, the ribbons may be dissolved sufficiently to weaken them before the subsequent steps, hereinafter detailed, can be applied to preserve them. Also, I have found that even under heat and pressure it is not always possible to bond the ribbons 11 and 12 together, particularly if the wire 13 is so placed between the ribbons that the ribbons are held apart by the wire, as such separation makes it difficult to force the ribbon surfaces together with adequate pressure and may even leave very minute air bubbles between the ribbons which will later cause the ribbons to separate when the plant-tie is rolled or twisted. I therefore imbed the wire 13 in one of the ribbons—say, the ribbon 11—in such a manner that it deforms the ribbon 11, forming a channel 15 on one side of the wire of a depth equal to the diameter of the wire and a ridge 16 on the outer side of the ribbon 11, while the other ribbon 12 is left flat and just tangent to the wire. Besides permitting the two ribbons to be pressed together right to the sides of the wire, instead of leaving an elongated eye-shaped cavity with the wire at its center, this construction permits the ribbon 11 to engage tightly at least 180 degrees of the periphery of the wire, and as hereinafter explained more often close to 270° of the periphery. Thus the wire 13 is bonded to the ribbon 11 and thereby to the plant-tie as a whole much more firmly than if each of the ribbons 11 and 12 made contact with peripheral angles of 60 to 90 degrees of the wire.

Figure 3:
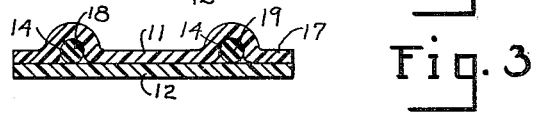
Fig. 3 is a cross-sectional view of a modified form of plant-tie.

In Fig. 3 I have shown a modified form of plant-tie 17 in which two wires 18 and 19 are held between the plastic ribbons 11 and 12, and adjacent the lateral margins of the plant-tie. Two wires so placed make a very strong tie which tends to remain flat and not to curl or fold; conversely, the force required to twist the tie applies considerably more torsion to the individual wires and tends to break them from their bond with the plastic ribbons. The bond provided by deforming the ribbon 11 so as to very largely surround the wire 13 and not deforming the strip 12 at all becomes a practical necessity with a plural-wire plant tie. The wires 18 and 19 are both imbedded in the ribbon 11, with the ribbon 12 merely tangent to the wires, and are cemented in their channels in the ribbon 11 by the cementitious coating 14.

Figure 4:
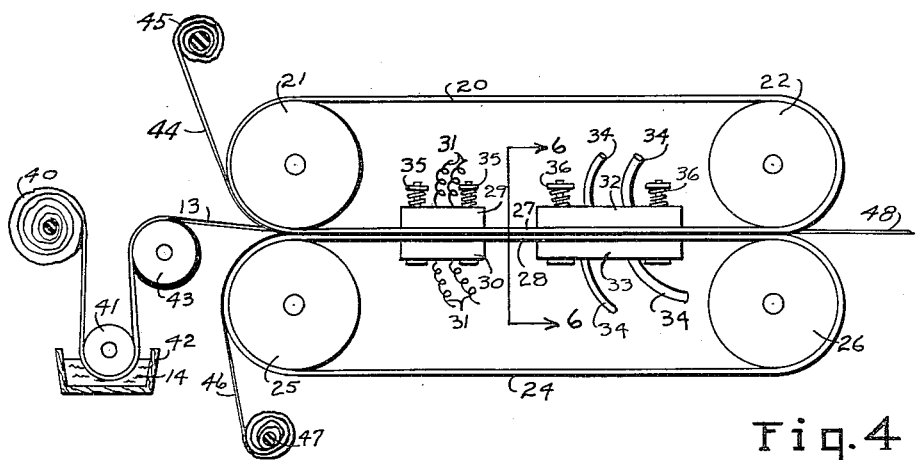
Fig. 4 is a schematic view of apparatus for manufacturing my improved plant tie.
Figure 5:
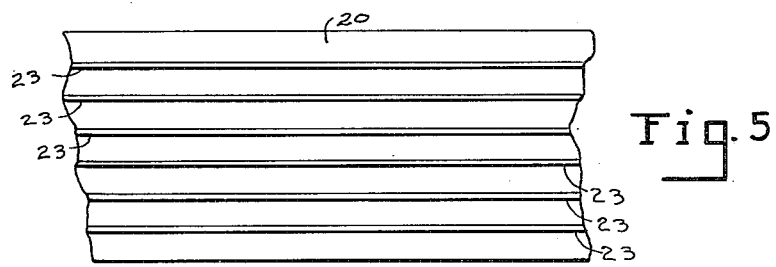
Fig. 5 is a plan view of a belt forming a part of said apparatus.
Figure 6:
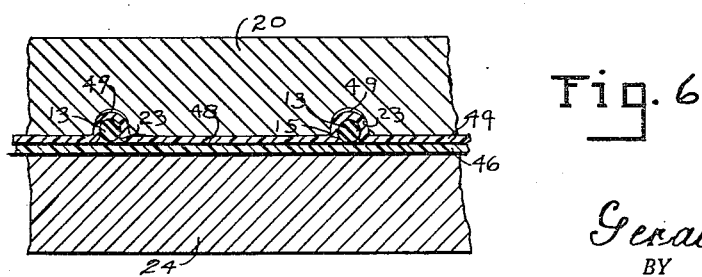
Fig. 6 is a cross sectional view, on an enlarged scale, showing how the belt of Fig. 5 is used in forming plant-ties.

In carrying out my method of manufacturing the plant-ties 10 and 17, I make use of the apparatus shown schematically in Fig. 4, and in more detail in Figs. 5 and 6. A steel belt 20 is mounted on pulleys 21 and 22 and has a plurality of longitudinal grooves 23 in its outer side. A second steel belt 24, having flat sides, is mounted on pulleys 25 and 26 so as to ride in contact with the belt 20. The belts 20 and 24 are driven at equal speeds from a suitable power source, not shown. The juxtaposed strands 27 and 28 of the belts 20 and 24 run between heating boxes 29 and 30, which may be heated electrically through wires 31, and between refrigerating boxes 32 and 33, to which a liquid refrigerant may be conducted through pipes 34. Springs 35 hold the box 29 under pressure against the belt strands 27 and 28, against the resistance of the box 30, and likewise springs 36 act upon the box 32 and the belt strands against the resistance of the box 33.

Wires 13 run from spools 40 around spindles 41 in a bath 42 of the quick-drying lacquer 14 and thence over guide spindles 43 into the nip of the belts 20 and 24 in individual alignment with the grooves 23. Although for diagrammatic purposes, only one wire 13 is shown in Fig. 4, it will be understood that there may be as many wires as there are grooves 23 in the belt 20 to receive the wires. A strip 44 of polyvinyl chloride, substantially corresponding in width to the belts 20 and 24, is fed from a spool 45 into the nip of the belts between the wires 13 and the grooved belt 20. A similar strip 46 is fed from a spool 47 into the nip of the belts between the wires 13 and the flat-surfaced belt 24. The strips 44 and 46, with the enclosed wires 13, form the wide band or ribbon 48, as shown in Figs. 4 and 6, which when subsequently sliced lengthwise forms the plant-ties 10 or 17.

The pressure of the flat-surfaced belt 24 forces the wires 13 into the grooves 23 of the belt 20. Each of the wires 13 deforms the strip 44 by forcing the strip into the grooves 23, to form the channels 15 and ridges 16. The width of each groove 23 is therefor selected to be the sum of the diameter of a wire and two thicknesses of the strip 44. Theoretically, in order to bring the wires 13 just tangent to the surface of the belt 24, the depth of the grooves should be the diameter of the wire, but I have found a slight amount of extra depth to be desirable, about one thickness of the strip 44. This may amount to only about three one-thousands of an inch but apparently provides a pocket to receive any excess material resulting from variations in the thickness of the strip, the diameter of the wire, and the lacquer coating 14, and may provide an air-cushion. Whatever be the reason for it I have found that without this slight extra depth, shown in Fig. 6 as the space 49, there is a tendency for the wires to extrude beyond the uncreased surface of the strip 44 and so to press against the strip 46, decreasing both the area of contact of the strip 44 with the wires and the area of contact of the strip 44 with the strip 46.

As the band 48 proceeds from the point of nip of the belts 20 and 24, contained between the belt strands 27 and 28, it passes between the heating boxes 29 and 30. The heat from these boxes, which hold the belts under pressure of the springs 35 is rapidly transmitted through the metal belts. The effect of the heat and pressure is to flow the plastic strips 44 and 46 together by softening the plastic material of the strips 44 and 46 and also to cause the softened material of the strip 44 to flow around the wires 13. Thus the strip 44 is caused to encompass much more than a peripheral angle of 180 degrees of the wire 13. As it is forced into the corners between the wires 13 and the flat strip 46 it may encompass over 270 degrees of arc on the wires. The application of heat and pressure is also an important preliminary step in preparing the strips and the thermoplastic coating 14 for subsequent "setting" in a strong bond by flowing together the similar thermoplastic materials. The application of heat not only softens the plastic strips 44 and 46, but also softens the dried coating of lacquer on the wires 13.

The belts 20 and 24 then convey the band 48 to the refrigerating boxes 32 and 33, where the metal belts and the contained ribbon are rapidly chilled, while receiving the pressure of the springs 36. The effect of the cold and pressure is to set the thermoplastic material of the strips 44 and 46 and the coating 14 in a strong bond between the strips 44 and 46 and between the strips and the wires 13.

I have found that if the band 48 is allowed to travel even a very short distance in an unsupported and unconfined state between heating and refrigerating units—for example, to travel in the open between heated and chilled rollers—there is a tendency for the heated material to crawl and even to separate. A wavy band, with pockets of air or gas, may result. With the band confined between the heated belts 20 and 24, there is little reduction in the temperature of the band as it travels from the boxes 29 and 30 to the boxes 32 and 33, and the effect of the boxes 32 and 33 is to produce a sudden and large temperature reduction, somewhat in the nature of, but not to the extent of, quick-freezing; and little or no gas formation is found in the product. The confinement and support afforded by the belts 20 and 24 to the band 48 also prevents the heated material from crawling and causing a wavy product. In this connection, the confinement of the wires 13 in the grooves 23 until the entire treatment is completed greatly assists in preventing the adjacent thermoplastic material from moving laterally.

When the now-unified and bonded band 48 emerges from between the belts 20 and 24 it may be sliced lengthwise in ribbons having either one wire, as in the plant-tie 10, or having a plurality of wires as in the plant-tie 17. The long ribbons may then be wound on spools or cut into lengths appropriate for individual plant-ties.

Not only does my method produce a plant-tie of great endurance and weather-proof qualities, which not even the torsion of twisting two parallel wires will easily break up, but it produces a plant-tie which may carry printing and advertising matter with superior legibility. The undeformed strips 46 may be printed in advance, and the printing will appear on a plane undeformed surface on the resultant plant-ties.

I wish it understood that many descriptive details in the foregoing specification are presented only as examples of my novel plant-tie and method of manufacture and may be varied and modified within the scope of the appended claims without departure from the spirit of my invention.

I claim:

1. A plant-tie comprising: two ribbons of polyvinyl chloride joined face to face in parallel to form a unified strip; a wire disposed between said ribbons lengthwise thereof; one of said ribbons being flat and the other of said ribbons having a channel at least as deep as the diameter of said wire, in which said wire is embedded; and a cementitious coating on said wire for bonding said wire to said ribbons.

2. The method of manufacturing a water-proof plant-tie which consists in: coating a wire with a cementitious material; disposing said wire between two strips of polyvinyl chloride; pressing said strips upon said wire so as to cause said wire to become embedded in only one of said strips, the other strip remaining substantially tangent to said wire, and continuously moving the band thus formed by said strips and said wire under pressure through the following steps; indirectly heat-treating said band, the heat being applied to and through pressure-producing elements; and indirectly cold-treating said band, the cold being applied to and through pressure-producing elements.

3. The method of manufacturing a water-proof plant-tie which consists in: coating a wire with a lacquer of the same family of resins as the hereinafter mentioned strips, said lacquer containing a volatile solvent; disposing said coated wire between two strips of polyvinyl chloride; forcing said wire into one of said strips so as to leave the other of said strips flat and said wire merely tangent thereto; heat-treating under pressure the band formed by said strips and said wire to cause said strips to adhere together and to said wire; and cold-treating said band under pressure to complete the bond between said strips and between said strips and said wire.

4. The method of manufacturing a water-proof plant-tie which consists in: coating a wire with polyvinyl chloride; disposing said coated wire between two strips of polyvinyl chloride; forcing said wire into one of said strips so as to leave the other of said strips flat and said wire merely tangent thereto; heat-treating under pressure the band formed by said strips and said wire to cause said strips to adhere together and to said wire; and cold-treating said band under pressure to complete the bond between said strips and between said strips and said wire.

5. The method of manufacturing a water-proof plant-tie which consists in: coating a wire with cementitious material disposing said wire between two strips of polyvinyl chloride and pressing said strips together to cause said wire to embed therein; and heat-treating and then cold-treating the band formed by said strips and said coated wire, said treatment being conducted under pressure. The method of manufacturing a plant-tie which consists in: coating a wire with cementitious material; disposing said wire between two ribbons of thermoplastic material, and pressing said ribbons together, to cause said wire to embed in one of said ribbons, said wire then producing a ridge on the outer side of said one ribbon; heating the band formed by said ribbons and said wire; pressing said ribbons to one another and to said wire to cause the heated material thereof to adhere together; cooling said band to cause the adhering materials thereof to bond together; and restricting lateral movement of said ridge and the contained wire continuously while said band is in heated condition.

7. The method of manufacturing a plant-tie which consists in: coating a wire with cementitious material; disposing said wire between two ribbons of thermoplastic material and pressing said ribbons together to cause said wire to embed therein; heat-treating the band formed by said ribbons and said coated wire, and pressing said ribbons together to cause the heated material thereof to adhere one ribbon to the other and to flow around and to adhere to said coated wire; maintaining said band temporarily in substantially fully heated condition; and then suddenly and rapidly cooling said band.

8. The method of manufacturing a plant-tie which consists in: coating a wire with cementitious material; disposing said wire between two ribbons of thermoplastic material and pressing said ribbons together to cause said wire to embed therein; heat-treating the band formed by said ribbons and said coated wire, and pressing said ribbons together to cause the heated material thereof to adhere one ribbon to the other and to flow around and to adhere to said coated wire; maintaining said band temporarily in substantially fully heated condition; and then suddenly and rapidly cooling said band under pressure.

References Cited in the file of this patent

UNITED STATES PATENTS

| Number | Name | Date |
| --- | --- | --- |
| 1,009,366 | Wirt | Nov. 21, 1911 |
| 1,474,699 | Wisbrock | Nov. 20, 1923 |
| 1,602,870 | Villiers | Oct. 12, 1926 |
| 2,076,343 | Humphner | Apr. 6, 1937 |
| 2,282,168 | Cunnington | May 5, 1942 |
| 2,344,457 | Christ | Mar. 14, 1944 |
| 2,512,337 | Klein | June 20, 1950 |
| 2,561,781 | Bruce | July 24, 1951 |
| 2,577,843 | Crosby et al. | Dec. 11, 1951 |
| 2,604,424 | Mathes | July 22, 1952 |
| 2,605,201 | Howe | July 29, 1952 |